Patented Mar. 9, 1926.

1,576,106

UNITED STATES PATENT OFFICE.

JOHN T. FETHERSTON, OF CUYLERVILLE, NEW YORK.

TREATMENT OF GARBAGE CONTAINERS AND GARBAGE.

No Drawing.   Application filed February 27, 1924. Serial No. 695,586.

*To all whom it may concern:*

Be it known that I, JOHN T. FETHERSTON, a citizen of the United States, residing at Cuylerville, in the county of Livingston, State of New York, have invented certain new and useful Improvements in the Treatment of Garbage Containers and Garbage; and I do hereby declare the following to be a full, clear, and exact description of the invention, such as will enable others skilled in the art to which it appertains to make and use the same.

This invention relates to an improved method of treating garbage containers and garbage, so as to reduce objectionable odors and nuisance.

Garbage is organic material resulting from the preparation and use of food. It contains mainly animal and vegetable matter originating in homes, stores, hotels, restaurants, boarding houses, apartments, etc. Average samples contain about 16% animal matter, 79% vegetable matter and 5% extraneous materials such as rubbish, crockery, glass, etc. Such a sample when analyzed will show 70% moisture, 3.5% grease, 1.5% bones, 5% extraneous material and 20% dry organic and vegetable matter called tankage used as a fertilizer base. The composition of garbage will vary however with the season of the year, the geographical location of a community and the character of the population whether rich or poor, industrial, residential, tenement, rural, etc. Garbage is a waste or refuse material in various stages of decay and its satisfactory storage, handling, transportation and disposal is an unsolved sanitary problem in most urban communities. From point of creation to place of ultimate disposal, odors, nuisance, flies, filth and fever accompany the storage, handling and treatment of garbage. Most cities require that garbage shall be kept in a covered metal receptacle and separated from other household or trade wastes such as ashes, rubbish or sweepings. The housewife or servant usually places the garbage in a galvanized iron can provided with a close fitting cover. The can or container is filled in or from the kitchen and is generally placed outside the building for removal and disposal by contractors or by the municipal authorities at more or less regular intervals varying from a day to a week. Unless garbage is removed promptly and regularly it creates serious nuisance especially in warm weather. Fresh garbage which is usually at kitchen temperature when first placed in the garbage can will remain at a temperature above 70 deg. F. in warm weather. Alcoholic fermentation soon begins, acetic acid fermentation develops and putrefaction of nitrogenous matter starts, decomposing the garbage and giving rise to foul and offensive odors. The sour objectionable smell of decaying garbage and filthy garbage containers is well known to all urban dwellers. If sufficiently prolonged the fermentation of garbage decomposes the fats or grease and greatly increases the free fatty acid content with a corresponding loss of valuable glycerine which might otherwise be recovered from the garbage by the reduction, extraction or other utilization process.

Various attempts have been made to treat fresh garbage so as to prevent odors and nuisance from the material itself and from the container in which it is placed, but with limited success. Municipal ordinances have been passed requiring the householder to drain the garbage in the kitchen sink and then wrap it in waste paper before placing it in the garbage can, but the difficulty of incinerating or reducing garbage tied in bundles has resulted in a discontinuance of this practice in certain cities. Most municipalities require the householder to keep the garbage can clean by frequent washing with water but this method is unsatisfactory and unreliable. Unless the garbage can is thoroughly washed, scraped and cleaned after each filling it soon becomes foul from the solid and liquid remnants in the corners or adhering to the sides and bottom of the can. These decomposing remnants usually contain organisms which promote fermentation and putrefaction so that when fresh garbage is placed in an unclean can it quickly becomes seeded with these organisms and the fresh garbage is rapidly decomposed especially in warm weather. As a result when garbage is placed in the usual can with its normal organic and moisture content, particularly in warm weather and where flies have access to the can, the garbage becomes a foul, maggoty, fly-breeding mess of putrefaction which is necessarily a nuisance wherever it is stored, handled or transported. Where house flies have access to the garbage either before it is placed in the can or while it is the can, the receptacle and the garbage become prolific breeding places for the dangerous house fly, particularly in warm weather when the garbage is not removed at frequent intervals.

The modern garbage can as placed on the market has a closely fitting cover, but in time, due to abuse, the cover or the can itself becomes injured or deformed, so that the cover no longer conforms to the container and allows the free admission of air and files, and the free escape of the objectionable odors. Even where garbage cans are emptied regularly, some of the garbage sticks to the bottom or sides of the can, and attempts to remove this residue by banging or battering the can against the garbage cart or other collection vehicle injures or deforms the can, making the cover fit less closely and increasing the tendency of the garbage to adhere to the irregular sides of the can.

In cold weather the metal walls of the ordinary garbage can promote freezing of the contents of the can, particularly the garbage which comes in contact with the metal walls of the container and this freezing of the garbage makes it more difficult to empty the can and results in deforming or injuring the can when attempts are made to remove this frozen garbage.

Not only is garbage on storage at the household, in an unclean garbage can a nuisance, but the handling, transportation through the streets and final disposition of garbage spreads the nuisance far and wide, particularly in warm weather and in crowded localities. Any simple means of retarding the decomposition of garbage will minimize nuisance not only about the home, restaurant and store but also in the streets where garbage collection vehicle pass and at the dumps or plants where garbage is incinerated or treated by a utilization process. Odors, nuisance, maggots and flies are natural sequences of decay, the elimination of which is an important sanitary problem in municipal organizations.

As as result of my investigations I have found that the nuisance caused by garbage and garbage cans can be greatly reduced or eliminated entirely by a simple method of treatment of the garbage containers and of the garbage therein. I have found that a small amount of dry sodium chloride or common salt, scattered on the bottom and sprinkled around the sides of the garbage can or receptacle, after the garbage is emptied, and before fresh garbage is placed therein will not only prevent the garbage from sticking to the can in ordinary weather but will also permit free emptying of the garbage from the can without sticking to the sides of the can and without scraping or battering the can. The salt does not apparently injure the interior of the garbage can or cause undue rusting, but instead tends to prevent the creation of objectionable odors and when applied to the moist walls of the can after emptying the receptacle, prevents or greatly retards contamination of fresh garbage by such liquid or traces of garbage as may remain in the can after being emptied. The salt thus sprinkled or scattered on the bottom of the can and around the sides of the can, adheres to the moist bottom and side walls, and also draws moisture from the garbage which comes in contact with it, insuring that the bottom and walls of the can are kept moist and do not become dry so that garbage will stick to them.

I have further found that by sprinkling or scattering a small amount of dry salt over the garbage after it has been placed in the can, this will further prevent or greatly reduce the formation of objectionable odors and otherwise prevent or greatly reduce the objectionable decomposition and fermentation to which the garbage nuisance is so largely due.

The salt used may be fine rock-salt in sizes from dust to a rice grain, obtainable as a by-product from the larger commercial sizes of salt. Such salt is obtainable at reasonable expense and is well suited for use in the process of the present invention. Other cheap and available grades of salt can likewise be employed. The amount of salt used in the process of the invention will necessarily vary with the size of the garbage cans. For the ordinary household garbage can, a handful or one-quarter of a pound of salt scattered on the bottom and around the sides of the can after the can is emptied and before adding fresh garbage, will usually be sufficient to accomplish the desired result. In investigations which I have made I have found that, with the use of such an amount of salt, the garbage can was always clean winter and summer; the contents did not freeze in ordinary winter weather, and the garbarge was freely emptied from the can, both in summer and winter, without sticking to the sides of the vessel or battering the can. I have further found, particularly in summer, that a handful of salt scattered over the garbage itself retarded decomposition and prevented odors to a marked degree.

I am aware that salt has long been used as a preservative, particularly of fresh fish, meats, animal products and fresh pickled vegetables, and the salt used in the process of the present invention doubtless exerts a preservative action of a similar character upon the organic materials with which it comes in contact; but garbage contains many and varied animal and vegetable materials, not fresh but in various stages of decay, and also cooked or partially cooked foods of various kinds with soiled crockery and rubbish. The organisms with which the various waste food materials may be inoculated, either in their natural state or through decay, or by inoculation prior to placing the waste materials in the garbage container, vary greatly, and when waste-food materials of various kinds in different stages of decay are placed indiscriminately in the garbage container, the varied character of the garbage furnishes an ideal medium for the accelerated development of the organisms which different portions of the garbage contain and for increasing the putrefactive fermentation and other processes which produce the objectionable odors characteristic of the garbage nuisance.

In addition to the processes which the garbage itself would naturally undergo, if placed in a thoroughly clean and sterilized garbage can, the inoculation of fresh garbage with the residue from old garbage, where the can is not properly cleaned, immediately inoculates the fresh garbage and greatly hastens the decomposition.

The improved process of the present invention is particularly advantageous in preventing or greatly reducing this contamination and inoculation of fresh garbage by residues which remain in the can when emptied. The treatment of the can according to the present invention effectively destroys any organisms remaining in the can which would otherwise start objectionable decomposition in fresh garbage, or so greatly retards their action as to prevent effectively or reduce the garbage nuisance. The local application of dry salt to the walls of the can also has a lubricating action owing to the hygroscopic nature of the salt and its extraction of water from adjacent garbage. Instead, therefore, of the garbage sticking to the bottom and walls of the can, its removal therefrom is facilitated and the can remains clean when emptied.

In addition to the treatment of the can or receptacle which is of primary importance, the garbage itself can be treated in the manner above described by sprinkling or scattering further amounts of salt upon it after it is placed in the can, and the formation of odors thereby further prevented or reduced.

The treatment of the garbage can and of the garbage according to the present invention also serves to protect the garbage from flies or to greatly reduce the breeding of flies in the garbage. The increased facility with which the contents of the can can be emptied and the decreased danger of battering the can greatly prolongs the life of the receptacle and insures a close fitting cover for a prolonged period of time, thus further tending to protect the garbage from flies and other insects. Preventing garbage from remaining in the can when emptied likewise reduces the possibility of the breeding of flies as the garbage might otherwise remain in the container a sufficient length of time for that purpose.

The advantages of the present invention extend not only to the prevention or reduction of the nuisance of the garbage can itself, but extend to the vehicles which collect the garbage and carry it to its place of final disposition as well as garbage awaiting treatment at places of final disposition. The treatment of garbage containers according to the present invention prevents or greatly reduces the early decomposition of fresh garbage through contamination with residues of old garbage remaining in the can when emptied, and this in turn causes the garbage to remain in a better state of preservation when collected and correspondingly reduces the nuisance caused by the collection and disposal of the material.

It will thus be seen that the present invention provides an improved method or process of treating garbage containers and receptacles in a simple and advantageous manner, whereby garbage cans may be kept clean without special cleaning operations, and whereby the contamination of fresh garbage with the residue of old garbage is prevented or greatly reduced, and whereby the garbage itself is maintained in a better state of preservation until it is collected and disposed of. The better state of preservation of the garbage is reflected in its increased value, particularly for reduction or utilization purposes, for the better preservation of the garbage reduces the decomposition of the fats which form the garbage grease, and gives an increased glycerine content and a decreased fatty acid content in the garbage grease extracted therefrom.

I claim:

1. The method of treating garbage containers which comprises sprinkling or scattering salt on the bottom and around the sides thereof.

2. The method of treating garbage containers which comprises sprinkling or scattering salt on the bottom and around the sides thereof after the garbage has been emptied from the container and before further amounts of garbage are introduced therein.

3. The method of treating garbage containers which comprises emptying the garbage therefrom and sprinkling or scattering salt over the bottom and sides of the can while still moist and before further amounts of garbage are introduced therein.

4. The method of preventing freezing of garbage to the bottom and side walls of garbage receptacles, which comprises sprinkling or scattering salt over said walls while still moist and before the garbage is introduced into the garbage receptacle.

5. The method of treating garbage and garbage receptacles which comprises sprinkling or scattering salt over the walls of the receptacle before the garbage is introduced therein and sprinkling or scattering further amounts of salt over the garbage after it is introduced therein.

6. The method of treating garbage and garbage receptacles which comprises removing the garbage from the receptacle, sprinkling or scattering salt over the walls of said receptacle while still moist from the removed garbage, introducing further amounts of garbage into the receptacle, and sprinkling or scattering further amounts of salt over the garbage after it is introduced therein.

In testimony whereof I affix my signature.

JOHN T. FETHERSTON.